United States Patent [19]

Lender

[11] 3,750,021

[45] July 31, 1973

[54] DATA TRANSMISSION EMPLOYING CORRELATIVE NONBINARY CODING WHERE THE NUMBER OF BITS PER DIGIT IS NOT AN INTEGER

[75] Inventor: Adam Lender, Palo Alto, Calif.

[73] Assignee: GTE Automatic Electric Laboratories Incorporated, Northlake, Ill.

[22] Filed: June 14, 1971

[21] Appl. No.: 152,875

[52] U.S. Cl. ................. 325/38 A, 325/41, 329/104, 332/9 R, 340/347 CC

[51] Int. Cl. ............................................ H04b 1/00

[58] Field of Search .................. 325/38 A, 38 R, 41, 325/42, 49, 50, 321–326, 328–330, 341; 179/15 AC, 15 AE, 15 AV, 15 BW, 15 BC, 15 FS; 332/9 R, 11 R; 329/102, 104; 340/347 P, 347 CC

[56] References Cited

UNITED STATES PATENTS

| | | | |
|---|---|---|---|
| 3,569,955 | 3/1971 | Maniere | 325/38 A |
| 3,457,510 | 7/1969 | Lender | 325/41 |
| 3,538,246 | 11/1970 | Macovski et al. | 325/38 A |

*Primary Examiner*—Albert J. Mayer
*Attorney*—K. Mullerheim, Leonard R. Cool, Russell A. Cannon and Theadore C. Jay, Jr.

[57] ABSTRACT

A digital transmission system in which serial binary data is changed, by encoding and correlative conversion, into a nonbinary signal of (2Q − 1)-levels for transmission of the binary data at a rate in bits per second that exceeds twice the frequency bandwidth of the channel in hertz. Encoding of the serial binary data is according to the general relation of $C = B + \Delta^2 C$ modulo Q where $C$ = coded nonbinary Q-level signal,
$B$ = nonbinary Q-level signal prior to coding,
$\Delta^2$ = a delay equal to two digit intervals, and
$Q$ = an integer that is not a power of two but is greater than one.

The use of Q values not a power of two dictates the need for redundant digits, forbidden patterns, in the $m$ sequential Q-level signals resulting from the coding process. This reduces the transmission efficiency but permits the detection of synchronization errors at the receiver. Correlative conversion is accomplished by subtraction of the present digit from the second digit back which then creates a (2Q − 1)-level correlative coded signal. The correlative conversion process eliminates any forbidden patterns that may have appeared as a result of the coding process. Thus, any forbidden patterns present during decoding result from fortuitous disturbances which may occur following correlative conversion. These forbidden patterns may represent lack of synchronization and the framing pattern of the receiver is adjusted using this detected information. The original binary data is recovered by first slicing and then demultiplexing to obtain $m$, Q-level signals. Finally, logic processing and parallel-to-serial conversion are used to obtain the serial binary data.

10 Claims, 8 Drawing Figures

PATENTED JUL 31 1973 3,750,021

SHEET 1 OF 5

INVENTOR
ADAM LENDER

BY

[signature]
AGENT

INVENTOR.
ADAM LENDER
BY
Leonard R. Cool
AGENT

PATENTED JUL 31 1973

3,750,021

SHEET 3 OF 5

INVENTOR.
ADAM LENDER

BY
Leonard R. Cool
AGENT

INVENTOR.
ADAM LENDER
BY
AGENT

DATA TRANSMISSION EMPLOYING CORRELATIVE NONBINARY CODING WHERE THE NUMBER OF BITS PER DIGIT IS NOT AN INTEGER

BACKGROUND OF THE INVENTION

1. Field of the Invention

This invention relates to high-speed transmission of digital data over communication channels of limited bandwidth. More particularly, correlative conversion using either the duobinary or the modified duobinary technique is combined with an encoding process to increase the through-put data rate of a nonbinary system in which the number of levels, Q, before conversion is not a power of two.

The system is not restricted to a specific channel or to a specific bandwidth and is applicable to any kind of communication channel. Where a telephone voice channel is employed the usable bandwidth is assumed to be 2,400 hertz. By using the modified duobinary technique, single-sideband modulated as described in U.S. Pat. No. 3,457,510 or the orthogonal two-channel system described in U.S. Pat. No. 3,515,991, the 2,400 hertz channel would accommodate 4,800 bits per second. By combining the modified duobinary technique with nonbinary encoding according to the relationship $C = B + \Delta^2 C$ modulo Q, data transmission rates of 9,600 bits per second, or 14,400 bits per second may be obtained when Q is 4 or 8, respectively. Such values of Q are a power of two. A technique for nonbinary encoding for Q equal to a power of two is described in my copending application entitled "High Speed Data Transmission System Utilizing Nonbinary Correlative Techniques," Ser. No. 807,578, dated Mar. 17, 1969 (now U.S. Pat. No. 3,601,702) and assigned to the assignee of the present application. Intermediate transmission rates of 7,200 bits per second, 10,800 bits per second or 12,000 bits per second may be obtained only where the value of Q is not a power of 2, for example, Q equal to 3, 5 or 6. Higher values of Q are, of course, also possible. The use of such values of Q would permit a high degree of flexibility in selecting the appropriate bit speed for a particular class of transmission media.

2. Description of the Prior Art

In my copending application (now U.S. Pat. No. 3,601,702) referenced hereinabove, the general concepts of coding, transmission and decoding of nonbinary signals using correlative techniques was introduced. By using a four-step process the information to be transmitted, usually in the form of serial binary data, is changed into a correlative nonbinary signal which has (2Q − 1) levels. First the serial binary data is converted into $\log_2 Q$ parallel binary data streams. Second, the parallel binary data streams are coded using logic gates, to introduce memory. Then, the coded binary signals, $\log_2 Q$ in number, are combined in a Q-level converter to obtain a coded multi-level signal having Q levels. Finally, the coded multilevel signal is passed through a bandpass filter which has a passband characteristic approximating the ideal sinusoid expressed by the formula $|1 - \epsilon^{-j2\omega T}|$ over the bandwidth 0 to ½T Hz. The effect of this filter is to subtract the present digit from the digit two intervals back. Because of the coding and correlation introduced into the data stream, each level at the output of the filter corresponds uniquely to one particular group of $\log_2 Q$ binary digits of the serial binary input signal. In addition, this permits ready recovery of the information at the receiving terminal by using straightforward logic means.

Besides contributing to a substantial increase in the data transmission rate, the correlation properties of the transmitted wave may be used to detect errors and thus obviate the need of introducing redundant digits into the binary data. Logic and sampling circuits provide a replica of the binary input data in parallel form except for errors that might have occured during transmission. This binary data is coded in exactly the same way as in the transmitter. The principle is to ascertain whether the extreme levels — top and bottom — correspond to the present and past digits emanating from the encoder and digital memory. A comparison is made at the sampling instant of the digit. If there is a disagreement, an error is indicated and memory is reset to restore the original condition.

While the foregoing data transmission systems provide efficient bandwidth compression when Q is equal to a power of two, such systems cannot be employed for values of Q that are not powers of two. Thus the use of intermediate speeds which may be desirable in a practical system is virtually precluded.

SUMMARY OF THE INVENTION

A serial binary data stream having a bit rate of 1/T bits per second is converted into n parallel binary streams each operating at a digit rate of $1/n$T digits per second, where T is equal to the time duration of the bit in seconds. Precoding of the $n$ input binary streams in a logic processor provides, $p$, coded binary output streams each at a rate of $1/n$T digits per second, where $p$ is greater than $n$. The following relation applies:

$$2^n < Q^m < 2^p \tag{1}$$

where $Q$ = an integer greater than one, not a power of two, which represents the number of levels or states before correlative conversion;

$m$ = an integer which represents the number of Q-nary digits in a nonbinary group;

$n$ = an integer which represents the number of binary digits in a group corresponding to the $Q^m$ group; and $p$ = an integer, greater than $n$, which permits representation in binary form of the number of states of $m$, Q-level digits.

The $p$ encoded binary streams are converted into $m$, Q-level signals by a sequential converter and then by correlative conversion the $m$, Q-level signals are changed into correlative coded (2Q − 1)-level signals for transmission.

Because it is necessary to represent the $Q^m$ states of the Q-level signal in binary form, the fact that Q is not a power of two necessitates the use of more binary streams than are included in the $2^n$ parallel binary input signals. Therefore, a number of forbidden states may exist at the output of the sequential converter. Such forbidden states will not exist after correlative conversion except where the waveform is affected by noise or other transmission impairments.

The received signal, having (2Q − 1) levels, is first applied to a threshold detector. In the detector both positive and negative levels are interpreted modulo Q so that there are Q output levels. The Q outputs are gated sequentially into one of the m, Q-stage shift registers at the digit line rate of $(1/T)\ (m/n)$ digits per second. The $m$ parallel outputs are read out in parallel at a rate which is $1/nT$ into a logic network. The patterns for each valid level are interpreted in terms of binary 1 or 0 and this binary information is applied in parallel to the stages of an $n$-stage output shift register at the rate of $1/nT$ pulses per second. The binary information is then read out from the $n$-stage register in serial form at the original data rate of 1/T bits per second. Invalid or forbidden patterns which may occur are applied to a separate stage of the logic network. The output from this stage is not applied to the n-stage shift register but is applied to the frame correction circuits since the presence of a forbidden pattern is indicative of a framing error.

It is therefore an object of this invention to obtain data transmission rates that are intermediate to those obtainable using nonbinary correlative techniques in which Q is a power of two.

It is another object of this invention to obtain these intermediate transmission rates using the simplest and most efficient logic.

It is yet another object of this invention to use the presence of forbidden patterns to correct the receiving clock framing signals and thereby correct for framing errors.

It is a further object of this invention to recover the nonbinary correlative signal using the simplest and most efficient logic.

BRIEF DESCRIPTION OF DRAWINGS

These and other objects of the invention may be more clearly understood by reference to the detailed description and the following drawings in which.

DETAILED DESCRIPTION

While the system of the invention may be used with and is applicable to any communications channels having the same or different bandwidths, the operation of the invention is herein described in terms of a typical telephone communications channel. The typical telephone channel is most readily available and it provides the communications link most desired for use in data communications. For high speed data transmission applications it is assumed, for purposes of discussion, that the effective bandwidth of this telephone channel is 2,400 Hz. With this bandwidth and the use of modified duobinary correlative techniques, the digit rate for any bit speed is 4,800 digits per second. It should be clearly understood, however, that this invention may be employed on communication channels of wider or narrower bandwidth and that the purpose of restricting the discussion to telephone channels is in the interest of clarity and should not be construed as a limitation of the invention.

Figure 1:
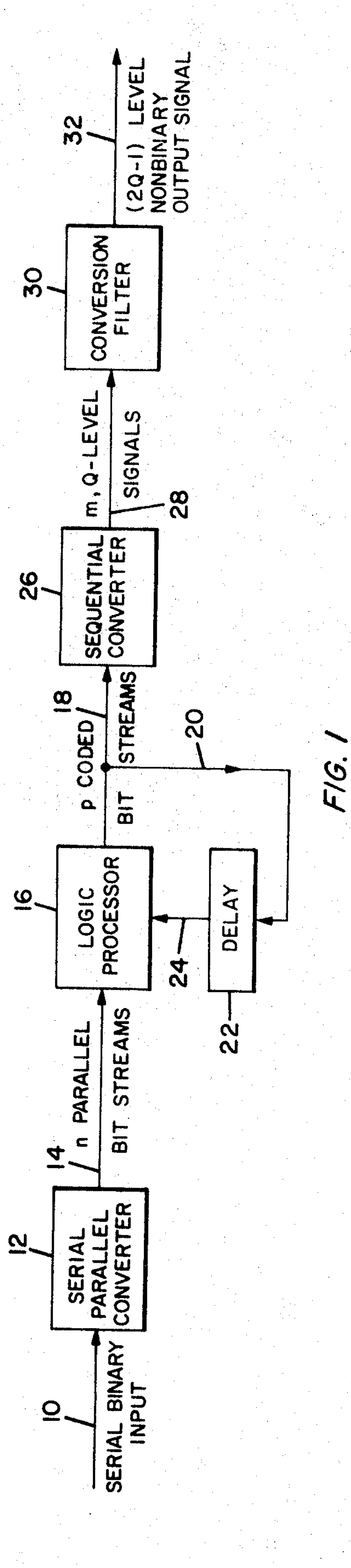
FIG. 1 is a block diagram of a nonbinary encoding and conversion process which performs the coding and correlative conversion of the serial binary data to obtain the nonbinary output signal according to the teachings of the invention.

Referring now to FIG. 1, serial binary data enters serial-to-parallel converter 12 via lead 10 from a source, not shown, such as a digital computer. The bit speed of the serial binary data and the effective bandwidth of the telephone channel may be used to determine the value of Q. Conversely, given a fixed bandlimited channel and a value of Q the bit speed that may be accommodated by the equipment in accordance with the teachings of the invention is readily determined. For example, Q may be 3, 5, 6, 7 or 9, etc. For Q = 3 the bit speed that may be accommodated is 7,200 bits per second for a 2,400 Hz channel. Referring again to FIG. 1, the serial binary data stream at the rate of 1/T bits per second is converted into $n$ parallel output binary streams in the serial-to-parallel converter with each of the $n$ streams having an effective rate of $1/nT$ digits per second. By assuming a value of Q the number of parallel streams, $n$, is determined by minimizing the quantity $Q^m > 2^n$. This minimizes the redundancy as will be explained later.

The $n$ parallel data streams are applied as one input to logic processor 16. The $p$ coded outputs from the logic processor are applied as the input to sequential converter 26 and as a second input to the logic processor 16 via path 20, delay 22 and path 24. Delay 22 introduces a time delay which corresponds to two time intervals, or $[2 \times nT/m]$ seconds, of the Q-level signal at the output of sequential converter 26. The coding process in the logic processor will be described later.

In order to complete the binary coding of the $n$ parallel input signals and to derive $m$, Q-level sequential signals, the number of coded binary outputs, $p$, from the logic processor 16, must satisfy the following condition: $Q^m < 2^p$, where the exponent $p$ is an integer selected to minimize the relationship. The reason for this inequality is that the number of states of the original binary data is to be represented by $m$, Q-level sequential signals at the output of sequential converter 26. At the input to logic processor 16 there are $n$ parallel binary bit streams which represent $2^n$ states. Since Q is not a power of two, the number of states that could be represented by $m$, Q-level signals must be greater than $2^n$. This leads to a loss of efficiency or, conversely, a redundancy in the coding process which is apparent from the following relations:

$n/m$ = number of bits per digit in a nonbinary system (2)

$2n/m$ = number of bits transmitted per Hz of bandwidth in a modified duobinary system, (3)

$(2^n/Q^m) \times 100$ = efficiency in percent, (4)

$$[1 - (2^n/Q^m)] \times 100 = \text{redundancy in percent,} \quad (5)$$

$$2Q - 1 = \text{number of levels after correlative conversion.} \quad (6)$$

The coding is consistent with the modified duobinary principles for encoding which indicate that $C = B + \Delta^2 C$ modulo Q. While some apparent simplification of logic would obtain using nonbinary signals, components are not available for such implementation. Because of the general availability of binary components, the encoding is accomplished as binary signals in logic processor 16. The $p$ coded output signals are then converted into groups of $m$, Q-level signals in sequential converter 26, and the $m$, Q-level sequential signals are applied via lead 28 to conversion filter 30. The filter provides correlative conversion by subtracting the second digit back from the present digit. The resultant is a correlative coded signal having (2Q − 1)-levels. It should be noted that conversion filter 30 can exist as a single filter at the transmitter as shown in FIG. 1. However, it is not required that the filter be at the transmitter. The filter could be located at the receiver or it could be divided between the transmitter and receiver. In the following discussion it will be assumed that the conversion filter is a single filter located at the transmitter as shown in FIG. 1, however, this should not be construed as a limitation of the invention.

Figure 2:
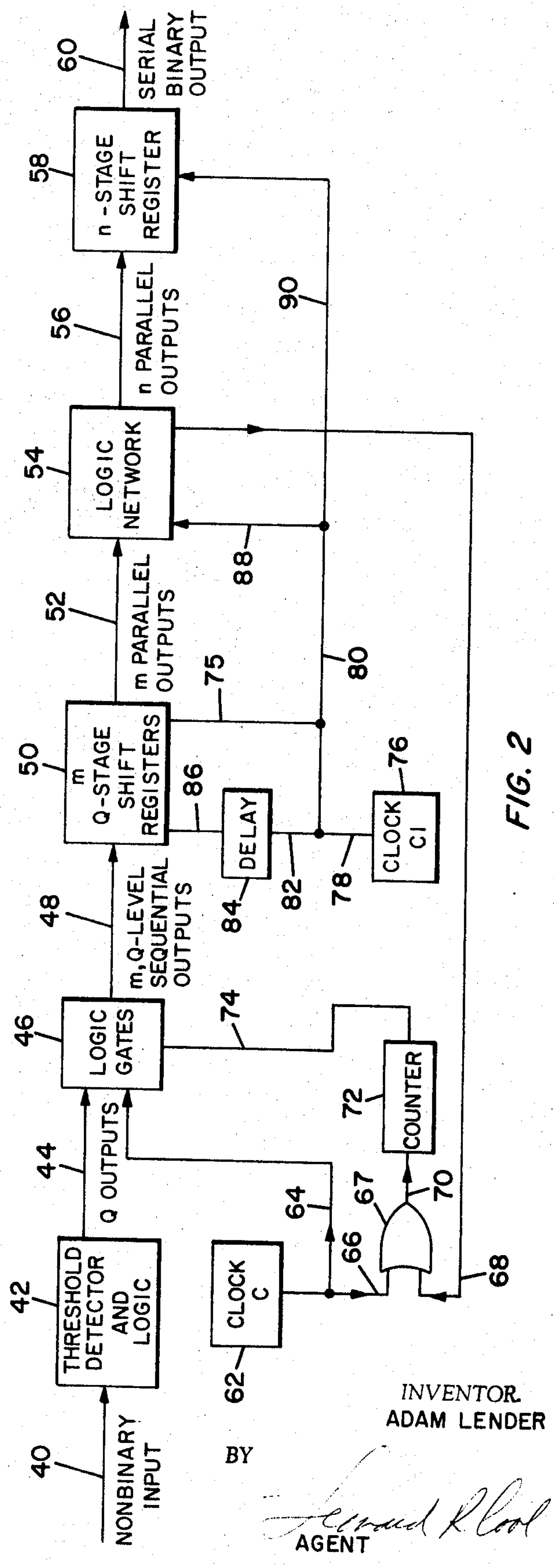
FIG. 2 is a block diagram of a binary data reconstructor, including the framing correction circuitry, which decodes the nonbinary correlative signal generated in the encoder of FIG. 1.

Following coding and conversion the (2Q −1)-level signal is transmitted over the communication channel. In the process, the signal may be subjected to various stages of modulation and demodulation before the signal arrives at its final destination. In addition to final demodulation, the signal may be subjected to delay equalization in a fixed delay equalizer or in some form of adjustable equalizer. Where a digital adaptive equalizer is employed such as the equalizer described in my copending application "Digital Adaptive Equalizer System," Ser. No. 24,791, filed Apr. 1, 1970 (now U.S. Pat. No. 3,633,105) and assigned to the assignee of the present application, some simplification of the receiver may be made in deriving the Q-level outputs desired at lead 44 in FIG. 2. The more general situation is illustrated in FIG. 2. Here the correlative coded nonbinary signal is first restored by demodulation, etc., as necessary, to obtain, at the input of the reconstructor, a (2Q − 1)-level nonbinary signal on input 40.

The (2Q − 1)-level nonbinary signal, after it passes through the carrier demodulation process, is analog in form but at the regular sampling instants has easily distinguishable discrete levels and it represents digital signal amplitudes both above and below zero, i.e., positive and negative. The action of threshold detector and logic 42 is to first determine the amplitude by means of conventional binary slicers (threshold detectors) and then by simple logic to convert the amplitude into one of Q-levels which would be applied to logic gates 46 via connection 44. Clock 62 operates at the digit rate for the bandlimited channel so that the $m$, Q-level signals are sequentially clocked into the $m$, Q-stage shift registers 50 via gates 46 and connector 48. Clock C1 shown at 76 in FIG. 2 is derived from clock C or both may be derived from a master clock. The C1 clock rate permits read-in of $m$, Q-level signals before parallel read-out of the $m$ parallel outputs via connection 52 into logic network 54 wherein the $m$ inputs to network 54 are converted into $n$ binary outputs. The $n$-binary outputs are applied in parallel via connections 56 to $n$-stage shift register 58. The logic network 54 performs the necessary logic to select the stages to which ones and zeros are applied in accordance with the original coding so that the serial binary data is reconstructed by serial read-out from shift register 58. The serial binary data then appears on output connection 60 where it would be applied to a data sink, not shown.

Whenever a forbidden pattern occurs it is detected by logic network 54 and the result is an output condition applied to counter 72 via connection 68, OR-gate 67 and connection 70. This output condition shifts counter 72 one step which thus changes the order of read-in to logic gates 46 of the Q outputs from threshold detector and logic 42. Each time a forbidden pattern appears, the counter is stepped one step. This will continue until the correct output patterns are obtained.

Figures 3, 4:
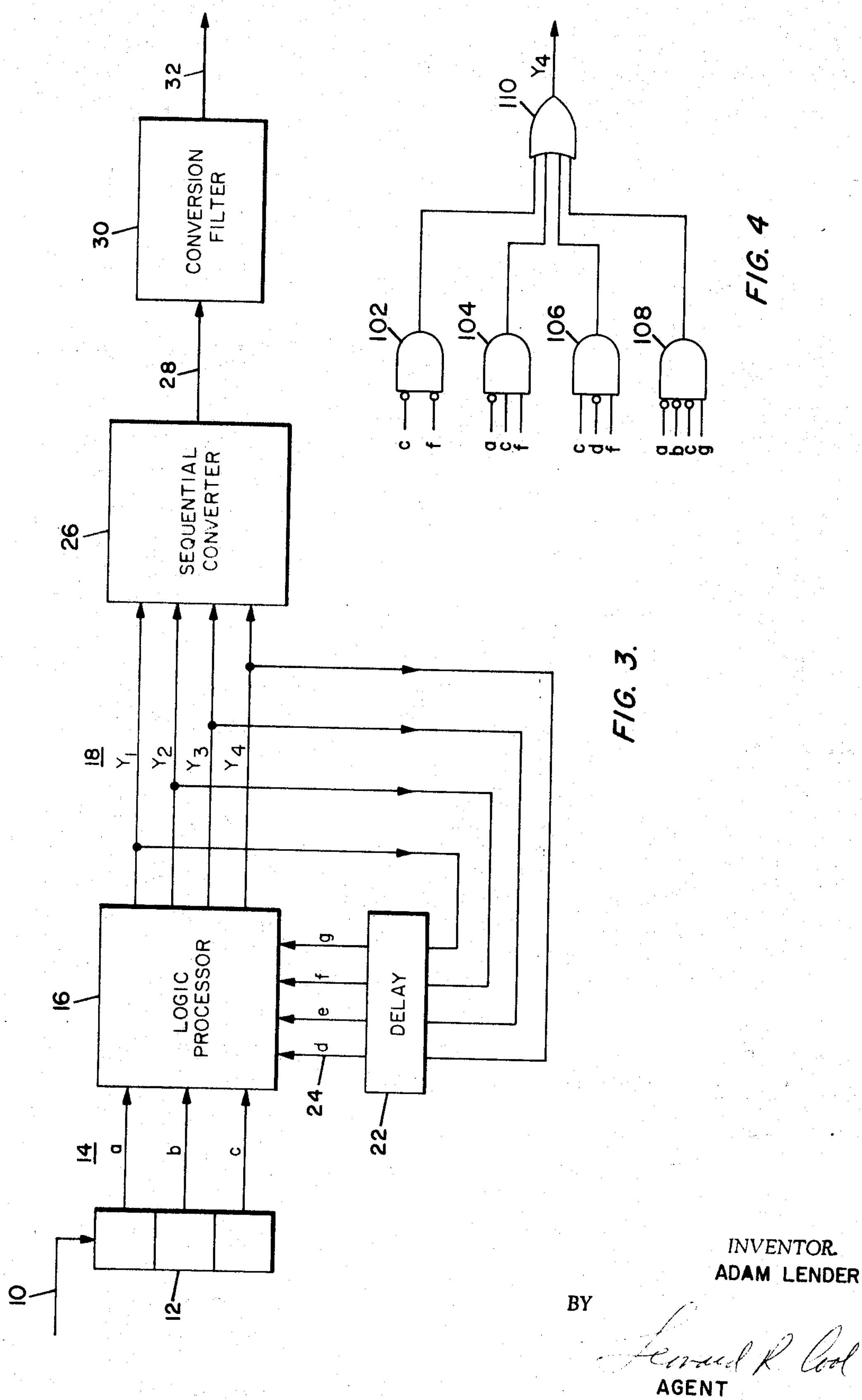
FIG. 3 is a block diagram of a nonbinary encoder arranged for coding and correlative conversion of a serial binary stream for the case where Q = 3.
FIG. 4 is a block diagram illustrating an embodiment of the coding logic for $Y_4 = \bar{e}\,\bar{f} + \bar{a}\,c\,f + c\,\bar{d}\,f + \bar{a}\,\bar{b}\,\bar{c}\,g$ for the case where Q = 3.

A clearer understanding of the principles of the invention may be obtained by applying these principles to a specific set of conditions. FIG. 3 shows an example of a nonbinary encoder arranged to operate at 7,200 bits per second over a 2,400 Hz communication channel. The modified duobinary technique is employed, and, therefore, the digit rate for any bit speed will be 4,800 digits per second. The ratio of bit speed to digit rate is 7,200/4,800 = 1.5 bits per digit. This ratio yields $n$ and $m$, since $n/m$ equals number of bits per digit. Both $n$ and $m$ are integers and, for this case, the smallest integers that satisfy the ratio of 1.5 are $n = 3$ and $m = 2$. Next, the inequality $Q^m > 2^n$ is minimized. Since $2^n = 8$ for our example, the minimum value of Q that will satisfy this relation is Q = 3 since $3^2 = 9 > 8$. The fact that $n = 3$ and Q = 3 is coincidental and it should be noted that $n$ is not the same as Q in most cases.

Thus, for serial binary data at 7,200 bits per second being transmitted over a 2,400 Hz channel, the data is converted in serial-to-parallel converter 12 into three parallel binary data streams with each operating at a rate of 7,200/$n$ = 2,400 bits per second.

Next we determine $p$ from the inequality $$Q^m < 2^p. \quad (1)$$

Since $Q^m = 9$, it is apparent that $2^p = 16$ or $p = 4$ is the minimum value of $p$ that will satisfy the relationship.

Referring now to FIG. 3, the nonbinary encoding process begins with the conversion of the serial binary data input at 10 into three parallel binary data streams at the output of the serial-to-parallel converter 12. These three parallel binary streams provide $2^3 = 8$ distinguishable states. The output of sequential converter 26 is composed of groups of $m$, Q-level signals. Since Q = 3 in this example, there will be two three-level (ternary digits) signals to represent the eight binary states. However, two ternary digits provide nine possible states. Thus one of the ternary states is not used. The selection of the state which is not employed is entirely arbitrary. One possible relationship of the binary input data from the three parallel binary data streams and the two ternary digits is given in Table I below. The eight binary states are represented by eight of the nine ternary states which are available from the two ternary digits which appear at the output of sequential converter 26. It should be noted that as a result of encoding, the output from logic processor 16 may contain the combination of encoded binary signals that result in a pair of ternary states which are not used, i.e., 2 2, and which were arbitrarily selected as the unused state or forbidden pattern. Because this combination may occur at this stage of coding and conversion, provisions must be made to accommodate the unused state.

TABLE I

| Binary | | | Ternary | |
|---|---|---|---|---|
| 0 | 0 | 0 | 0 | 0 |
| 0 | 0 | 1 | 0 | 1 |
| 0 | 1 | 0 | 0 | 2 |
| 0 | 1 | 1 | 1 | 0 |
| 1 | 0 | 0 | 1 | 1 |
| 1 | 0 | 1 | 1 | 2 |
| 1 | 1 | 0 | 2 | 0 |
| 1 | 1 | 1 | 2 | 1 |
| Forbidden Pattern | | | 2 | 2 |

To be able to represent all nine ternary pair states an additional binary digit must be included in the output from logic processor 16. Thus four coded binary outputs are obtained which permit representation of a total of 16 states of which only nine will ever appear. The four encoded bit streams appearing on connection 18 are applied both to sequential converter 26 and as inputs to logic processor 16 via connection 20, delay 22 and connection 24. In this particular example there are four parallel binary encoded bit streams each having a rate of 2,400 digits per second. The digits applied to logic processor 16 are the delayed feedback of the general coding formula.

The coded binary signals applied to sequential converter 26 are converted from binary to two successive ternary digits in accordance with Table II below. This conversion is a conversion to two sequential ternary digits where the first ternary digit is the most significant and the second the least significant. The ternary digits appear in pairs and their digit rate is 4,800 digits per second. For the general case we thus have *m*, Q-level signals at the output of sequential converter 26 which are applied via lead 28 to conversion filter 30. For the instant example, all nine possible pairs of ternary digits may appear on lead 28 and this includes the forbidden pair 2 2.

TABLE II

| Coded Binary $Y_1$ | $Y_2$ | $Y_3$ | $Y_4$ | Ternary | |
|---|---|---|---|---|---|
| 0 | 0 | 0 | d | 0 | 0 |
| 0 | 0 | 1 | d | 0 | 1 |
| 0 | 1 | 0 | d | 0 | 2 |
| 0 | 1 | 1 | d | 1 | 0 |
| 0 | 0 | 0 | d | 1 | 1 |
| 1 | 0 | 1 | d | 1 | 2 |
| 1 | 1 | 0 | d | 2 | 0 |
| 1 | 1 | 1 | 0 | 2 | 1 |
| 1 | 1 | 1 | 1 | 2 | 2 |

The designation *d* above indicates the "don't care" condition, well known in combinational logic. In Table II the forbidden state 2 2 is represented and although it is necessary for encoding, it will never occur after the conversion filter 30 unless the waveform is impaired by noise or other line conditions.

The next step is the correlative conversion process accomplished by the conversion filter 30. The characteristics of conversion filter 30 are expressed by the well-known modified duobinary frequency characteristic in baseband form. The spectral density is:

$$|1 - \epsilon^{-j2\omega T}|^2 \text{ for } 0 \leq f \leq \tfrac{1}{2}\tau$$

and 0 elsewhere where $\omega = 2\pi f$ $f$ = frequency in hertz $\tau$ = 1/4,800 seconds for the case in point, which is the duration of the digit on the line in seconds after the correlative conversion to (2Q − 1) levels.

The frequency attenuation characteristic is identical for either binary or nonbinary waveforms. The conversion filter can be regarded as delaying the Q-level ternary signal by two unit intervals or $2\tau$ seconds and subtracting it from itself. Since the filter cuts off at $1/2\tau$ hertz and has high loss above this frequency, it also shapes the signal into an analog form confined to the band limited spectrum $1/2\tau$ hertz. Algebraic subtraction of a three-level waveform (Q = 3) from its delayed replica results in a five-level waveform, (2Q − 1)-levels, at the output of filter 30 which is connected to the transmission facility via leads 32. At this point the signal has the same digit speed of 4,800 digits per second as it did at 28. The bit speed at 32 is 7,200 bits per second, since each digit carries 1.5 bits of information. The conversion filter characteristic can be split in any desirable way. For example, it can be split between the tramsmitter and the receiver for the best way to minimize noise. To simplify the discussion, the conversion filter is considered to exist only at the transmitter as shown by 30 of FIG. 1 and FIG. 3.

Referring again to FIG.3, it should be noted that the inputs to logic processor 16 are labeled *a* through *g*. Inputs *a*, *b* and *c* are the uncoded binary inputs from serial-to-parallel converter 12 with a the most significant digit and *c* the least significant digit. The coded binary outputs are denoted by $Y_1$ through $Y_4$. These coded outputs are delayed by one binary digit interval in delay 22 which corresponds to 1/2,400 seconds at the output of logic processor 16. Such a delay corresponds to two time intervals of the ternary digits which appear at 28. A single time interval for the ternary digit is 1/4,800 seconds. A delay of two such intervals requires, therefore, 1/2,400 seconds. Since $Y_1$ through $Y_4$ constitute binary representation of pairs of ternary digits but at a rate of 2,400 digits per second, a delay at the 2,400 rate is equivalent to two units delay at 4,800 digits per second which occurs at the output of sequential converter 26.

The delayed replicas of $Y_1$ through $Y_4$ denoted as *d*, *e*, *f* and *g* are fed back as another input to logic processor 16. This is consistent with the modified duobinary principles for encoding which indicate that $C = B + \Delta^2 C$ modulo Q, where Q = 3 for this case. Consequently, logic processor 16 has seven inputs and four outputs. The logic processor operates at 2,400 digits per second and is binary rather than ternary because binary logic components are available and practical systems must currently be implemented using binary digital components. The truth table for the logic processor could be expressed in terms of ternary logic. Since implementation is binary, the complete truth table is given in Table III in binary form. Here the inputs are *a* through *g* and the outputs are $Y_1$ through $Y_4$.

TABLE III

| INPUT | | | | | | | OUTPUT | | | |
|---|---|---|---|---|---|---|---|---|---|---|
| | b | c | d | e | f | g | $V_1$ | $Y_2$ | $Y_3$ | $Y_4$ |
| 0 | 0 | 0 | 0 | 0 | 0 | 0 | 0 | 0 | 0 | *d* |
| 0 | 0 | 0 | 0 | 0 | 0 | 1 | 0 | 0 | 0 | *d* |
| 0 | 0 | 0 | 0 | 0 | 1 | 0 | 0 | 0 | 1 | *d* |
| 0 | 0 | 0 | 0 | 0 | 1 | 1 | 0 | 0 | 1 | *d* |
| 0 | 0 | 0 | 0 | 1 | 0 | 0 | 0 | 1 | 0 | *d* |
| 0 | 0 | 0 | 0 | 1 | 0 | 1 | 0 | 1 | 0 | *d* |
| 0 | 0 | 0 | 0 | 1 | 1 | 0 | 0 | 1 | 1 | *d* |
| 0 | 0 | 0 | 0 | 1 | 1 | 1 | 0 | 1 | 1 | *d* |
| 0 | 0 | 0 | 1 | 0 | 0 | 0 | 1 | 0 | 0 | *d* |
| 0 | 0 | 0 | 1 | 0 | 0 | 1 | 1 | 0 | 0 | *d* |

| | | | | | | | | | | |
|---|---|---|---|---|---|---|---|---|---|---|
| 0 | 0 | 0 | 1 | 0 | 1 | 0 | 1 | 0 | 1 | d |
| 0 | 0 | 0 | 1 | 0 | 1 | 1 | 1 | 0 | 1 | d |
| 0 | 0 | 0 | 1 | 1 | 0 | 0 | 1 | 1 | 0 | d |
| 0 | 0 | 0 | 1 | 1 | 0 | 1 | 1 | 1 | 1 | d |
| 0 | 0 | 0 | 1 | 1 | 1 | 0 | 1 | 1 | 1 | 0 |
| 0 | 0 | 0 | 1 | 1 | 1 | 1 | 1 | 1 | 1 | 1 |
| 0 | 0 | 1 | 0 | 0 | 0 | 0 | 0 | 0 | 1 | d |
| 0 | 0 | 1 | 0 | 0 | 0 | 1 | 0 | 0 | 1 | d |
| 0 | 0 | 1 | 0 | 0 | 1 | 0 | 0 | 1 | 0 | d |
| 0 | 0 | 1 | 0 | 0 | 1 | 1 | 0 | 1 | 0 | d |
| 0 | 0 | 1 | 0 | 1 | 0 | 0 | 0 | 0 | 0 | d |
| 0 | 0 | 1 | 0 | 1 | 0 | 1 | 0 | 0 | 0 | d |
| 0 | 0 | 1 | 0 | 1 | 1 | 0 | 1 | 0 | 0 | d |
| 0 | 0 | 1 | 0 | 1 | 1 | 1 | 1 | 0 | 0 | d |
| 0 | 0 | 1 | 1 | 0 | 0 | 0 | 1 | 0 | 1 | d |
| 0 | 0 | 1 | 1 | 0 | 0 | 1 | 1 | 0 | 1 | d |
| 0 | 0 | 1 | 1 | 0 | 1 | 0 | 0 | 1 | 1 | d |
| 0 | 0 | 1 | 1 | 0 | 1 | 1 | 1 | 1 | 1 | d |
| 0 | 0 | 1 | 1 | 1 | | 0 | 1 | 1 | 1 | 0 |
| 0 | 0 | 1 | 1 | 1 | 0 | 1 | 1 | 1 | 1 | 0 |
| 0 | 0 | 1 | 1 | 1 | 1 | 0 | 1 | 1 | 1 | 1 |
| 0 | 0 | 1 | 1 | 1 | 1 | 1 | 1 | 1 | 0 | d |
| 0 | 1 | 0 | 0 | 0 | | 0 | 0 | 1 | 0 | d |
| 0 | 1 | 0 | 0 | 0 | 0 | 1 | 0 | 1 | 0 | d |
| 0 | 1 | 0 | 0 | 0 | 1 | 0 | 0 | 0 | 0 | d |
| 0 | 1 | 0 | 0 | 0 | 1 | 1 | 0 | 0 | 0 | d |
| 0 | 1 | 0 | 0 | 1 | 0 | 0 | 0 | 0 | 1 | d |
| 0 | 1 | 0 | 0 | 1 | 0 | 1 | 0 | 0 | 1 | d |
| 0 | 1 | 0 | 0 | 1 | 1 | 0 | 1 | 0 | 1 | d |
| 0 | 1 | 0 | 0 | 1 | 0 | 1 | 1 | 0 | 1 | d |
| 0 | 1 | 0 | 1 | 0 | 0 | 0 | 0 | 1 | 1 | d |
| 0 | 1 | 0 | 1 | 0 | 0 | 1 | 0 | 1 | 1 | d |
| 0 | 1 | 0 | 1 | 0 | 1 | 0 | 1 | 0 | 0 | d |
| 0 | 1 | 0 | 1 | 0 | 1 | 1 | 1 | 0 | 0 | d |
| 0 | 1 | 0 | 1 | 1 | 0 | 0 | 1 | 1 | 1 | 1 |
| 0 | 1 | 0 | 1 | 1 | 0 | 1 | 1 | 1 | 1 | 1 |
| 0 | 1 | 0 | 1 | 1 | 1 | 0 | 1 | 1 | 0 | d |
| 0 | 1 | 0 | 1 | 1 | 1 | 1 | 1 | 1 | 1 | 0 |
| 0 | 1 | 1 | 0 | 0 | 0 | 0 | 0 | 1 | 1 | d |
| 0 | 1 | 1 | 0 | 0 | 0 | 1 | 0 | 1 | 1 | d |
| 0 | 1 | 1 | 0 | 0 | 1 | 0 | 1 | 0 | 0 | d |
| 0 | 1 | 1 | 0 | 0 | 1 | 1 | 1 | 0 | 0 | d |
| 0 | 1 | 1 | 0 | 1 | 0 | 0 | 1 | 0 | 1 | d |
| 0 | 1 | 1 | 0 | 1 | 0 | 1 | 1 | 0 | 1 | d |
| 0 | 1 | 1 | 0 | 1 | 1 | 0 | 1 | 1 | 0 | d |
| 0 | 1 | 1 | 0 | 1 | 1 | 1 | 1 | 1 | 0 | d |
| 0 | 1 | 1 | 1 | 0 | 0 | 0 | 1 | 1 | 1 | 0 |
| 0 | 1 | 1 | 1 | 0 | 0 | 1 | 1 | 1 | 1 | 0 |
| 0 | 1 | 1 | 1 | 0 | 1 | 0 | 1 | 1 | 1 | 1 |
| 0 | 1 | 1 | 1 | 0 | 1 | 1 | 1 | 1 | 1 | 1 |
| 0 | 1 | 1 | 1 | 1 | 0 | 0 | 0 | 0 | 0 | d |
| 0 | 1 | 1 | 1 | 1 | 0 | 1 | 0 | 0 | 0 | d |
| 0 | 1 | 1 | 1 | 1 | 1 | 0 | 0 | 0 | 1 | d |
| 0 | 1 | 1 | 1 | 1 | 1 | 1 | 0 | 1 | 0 | d |
| 1 | 0 | 0 | 0 | 0 | 0 | 0 | 1 | 0 | 0 | d |
| 1 | 0 | 0 | 0 | 0 | 0 | 1 | 1 | 0 | 0 | d |
| 1 | 0 | 0 | 0 | 0 | 1 | 0 | 1 | 0 | 1 | d |
| 1 | 0 | 0 | 0 | 0 | 1 | 1 | 1 | 0 | 1 | d |
| 1 | 0 | 0 | 0 | 1 | 0 | 0 | 0 | 1 | 1 | d |
| 1 | 0 | 0 | 0 | 1 | 0 | 1 | 0 | 1 | 1 | d |
| 1 | 0 | 0 | 0 | 1 | 1 | 0 | 1 | 1 | 1 | 0 |
| 1 | 0 | 0 | 0 | 1 | 1 | 1 | 1 | 1 | 1 | 0 |
| 1 | 0 | 0 | 1 | 0 | 0 | 0 | 1 | 1 | 1 | 1 |
| 1 | 0 | 0 | 1 | 0 | 0 | 1 | 1 | 1 | 1 | 1 |
| 1 | 0 | 0 | 1 | 0 | 1 | 0 | 1 | 1 | 0 | d |
| 1 | 0 | 0 | 1 | 0 | 1 | 1 | 1 | 1 | 0 | d |
| 1 | 0 | 0 | 1 | 1 | 0 | 0 | 0 | 0 | 1 | d |
| 1 | 0 | 0 | 1 | 1 | 0 | 1 | 0 | 0 | 1 | d |
| 1 | 0 | 0 | 1 | 1 | 1 | 0 | 0 | 1 | 0 | d |
| 1 | 0 | 0 | 1 | 1 | 1 | 1 | 0 | 0 | 0 | d |
| 1 | 0 | 1 | 0 | 0 | 0 | 0 | 1 | 0 | 1 | d |
| 1 | 0 | 1 | 0 | 0 | 0 | 1 | 1 | 0 | 1 | d |
| 1 | 0 | 1 | 0 | 0 | 1 | 0 | 0 | 1 | 1 | d |
| 1 | 0 | 1 | 0 | 0 | 1 | 1 | 0 | 1 | 1 | d |
| 1 | 0 | 1 | 0 | 1 | 0 | 0 | 1 | 0 | 0 | d |
| 1 | 0 | 1 | 0 | 1 | 0 | 1 | 1 | 0 | 0 | d |
| 1 | 0 | 1 | 0 | 1 | 1 | 0 | 1 | 1 | 1 | 1 |
| 1 | 0 | 1 | 0 | 1 | 1 | 1 | 1 | 1 | 1 | 1 |
| 1 | 0 | 1 | 1 | 0 | 0 | 0 | 1 | 1 | 0 | d |
| 1 | 0 | 1 | 1 | 0 | 0 | 1 | 1 | 1 | 0 | d |
| 1 | 0 | 1 | 1 | 0 | 1 | 0 | 1 | 1 | 1 | 0 |
| 1 | 0 | 1 | 1 | 0 | 1 | 1 | 1 | 1 | 1 | 0 |
| 1 | 0 | 1 | 1 | 1 | 0 | 0 | 0 | 1 | 0 | d |
| 1 | 0 | 1 | 1 | 1 | 0 | 1 | 0 | 1 | 0 | d |
| 1 | 0 | 1 | 1 | 1 | 1 | 0 | 0 | 0 | 0 | d |
| 1 | 0 | 1 | 1 | 1 | 1 | 1 | 0 | 0 | 1 | d |
| 1 | 1 | 0 | 0 | 0 | 0 | 0 | 1 | 1 | 0 | d |
| 1 | 1 | 0 | 0 | 0 | 0 | 1 | 1 | 1 | 0 | d |
| 1 | 1 | 0 | 0 | 0 | 1 | 0 | 1 | 1 | 1 | 0 |
| 1 | 1 | 0 | 0 | 0 | 1 | 1 | 1 | 1 | 1 | 0 |
| 1 | 1 | 0 | 0 | 1 | 0 | 0 | 1 | 1 | 1 | 1 |
| 1 | 1 | 0 | 0 | 1 | 0 | 1 | 1 | 1 | 1 | 1 |
| 1 | 1 | 0 | 0 | 1 | 1 | 0 | 0 | 0 | 0 | d |
| 1 | 1 | 0 | 0 | 1 | 1 | 1 | 0 | 0 | 0 | d |
| 1 | 1 | 0 | 1 | 0 | 0 | 0 | 0 | 0 | 1 | d |
| 1 | 1 | 0 | 1 | 0 | 0 | 1 | 0 | 0 | 1 | d |
| 1 | 1 | 0 | 1 | 0 | 1 | 0 | 0 | 1 | 0 | d |
| 1 | 1 | 0 | 1 | 0 | 1 | 1 | 0 | 1 | 0 | d |
| 1 | 1 | 0 | 1 | 1 | 0 | 0 | 0 | 1 | 1 | d |
| 1 | 1 | 0 | 1 | 1 | 0 | 1 | 0 | 1 | 1 | d |
| 1 | 1 | 0 | 1 | 1 | 1 | 0 | 1 | 0 | 0 | d |
| 1 | 1 | 0 | 1 | 1 | 1 | 1 | 1 | 0 | 1 | d |
| 1 | 1 | 1 | 0 | 0 | 0 | 0 | 1 | 1 | 1 | 0 |
| 1 | 1 | 1 | 0 | 0 | 0 | 1 | 1 | 1 | 1 | 0 |
| 1 | 1 | 1 | 0 | 0 | 1 | 0 | 1 | 1 | 1 | 1 |
| 1 | 1 | 1 | 0 | 0 | 1 | 1 | 1 | 1 | 1 | 1 |
| 1 | 1 | 1 | 0 | 1 | 0 | 0 | 1 | 1 | 0 | d |
| 1 | 1 | 1 | 0 | 1 | 0 | 1 | 1 | 1 | 0 | d |
| 1 | 1 | 1 | 0 | 1 | 1 | 0 | 0 | 0 | 1 | d |
| 1 | 1 | 1 | 0 | 1 | 1 | 1 | 0 | 0 | 1 | d |
| 1 | 1 | 1 | 1 | 0 | 0 | 0 | 0 | 1 | 0 | d |
| 1 | 1 | 1 | 1 | 0 | 0 | 1 | 0 | 1 | 0 | d |
| 1 | 1 | 1 | 1 | 0 | 1 | 0 | 0 | 0 | 0 | d |
| 1 | 1 | 1 | 1 | 0 | 1 | 1 | 0 | 0 | 0 | d |
| 1 | 1 | 1 | 1 | 1 | 0 | 0 | 1 | 0 | 0 | d |
| 1 | 1 | 1 | 1 | 1 | 0 | 1 | 1 | 0 | 0 | d |
| 1 | 1 | 1 | 1 | 1 | 1 | 0 | 1 | 0 | 1 | d |
| 1 | 1 | 1 | 1 | 1 | 1 | 1 | 0 | 1 | 1 | d |

This logic has been minimized by prime implicants and subsequently by essential prime implicants. The minimization technique is described at Chapter 7 in the text, "Introduction to Switching Theory and Logical Design," by F. S. Hill and G. R. Peterson; John Wiley & Sons, Inc., New York, 1968. Results of the minimization process in terms of the expressions for $Y_1$ through $Y_4$ are as follows:

$$Y_1 = \overline{a\,\bar{b}\,c}\,d + a\,\overline{c\,d}\,e + \overline{a\,c}\,d\,f + \overline{a\,b}\,d\,e + \overline{a\,c}\,d\,e + a\,\bar{b}\,d\,\bar{e} + a\,c\,\overline{d\,f} + a\,b\,\bar{d}\,e + a\,b\,\overline{d\,f} + a\,\overline{b\,c\,d}\,f + \bar{b}\,c\,\bar{d}\,e\,f + \bar{a}\,b\,\bar{d}\,e\,f + \bar{a}\,b\,c\,\bar{d}\,f + \bar{a}\,b\,c\,\bar{d}\,e + \bar{a}\,b\,c\,d\,\bar{e} + b\,\bar{c}\,d\,e\,f + a\,b\,c\,e\,\bar{f} + a\,b\,c\,d\,e\,\bar{g} \quad (7)$$

$$Y_2 = \overline{a\,b\,c}\,e + \overline{b\,c\,d}\,e + \bar{a}\,b\,\overline{e\,f} + \overline{a\,b}\,d\,e + \overline{a\,c}\,d\,e + \overline{b\,c}\,\bar{e}\,f + \bar{a}\,c\,d\,\bar{e} + \bar{b}\,c\,d\,\bar{f} + c\,d\,\overline{e\,f} + a\,\bar{b}\,d\,\bar{e} + a\,b\,\bar{d}\,e + a\,b\,\overline{d\,f} + \overline{b\,c}\,e\,f\,\bar{g} + a\,\bar{b}\,\bar{d}\,e\,f + a\,\bar{c}\,d\,\bar{e}\,f + a\,b\,\bar{c}\,e\,\bar{f} + \bar{a}\,b\,c\,\bar{d}\,e\,f + b\,c\,d\,e\,f\,g \quad (8)$$

$$Y_3 = \overline{a\,b\,c}\,f + c\,\overline{d\,e\,f} + b\,\bar{c}\,e\,\bar{f} + a\,\overline{d\,e}\,f + a\,\bar{c}\,d\,\bar{f} + a\,c\,\bar{d}\,f + \overline{a\,c\,d}\,e\,f + \bar{a}\,b\,\bar{d}\,e\,\bar{f} + \bar{a}\,b\,d\,\overline{e\,f} + a\,\overline{b\,c\,d}\,e + \bar{a}\,c\,d\,\bar{e}\,f + \bar{b}\,c\,d\,\overline{e\,f} + \bar{a}\,c\,d\,f\,\bar{g} + b\,\bar{c}\,d\,e\,g + a\,\bar{b}\,c\,f\,g + a\,b\,c\,e\,f + \overline{a\,b}\,c\,d\,e\,\bar{f} \quad (9)$$

$$Y_4 = \overline{c\,f} + \bar{a}\,c\,f + c\,\bar{d}\,f + \overline{a\,b\,c}\,g \quad (10)$$

Actual implementation which will satisfy the foregoing logic expressions may be accomplished in any number of ways. One of several possible ways to do this is by the use of AND-gates and OR-gates. In the interest of clarity and simplicity clock timing is not shown and only the implementation of the expression for $Y_4$ is shown in FIG. 4. Here four AND-gates are used; a two-input AND-gate 102, two three-input AND-gates 104 and 106 and one four input AND-gate 108. Note that there is one AND-gate for each term of the logic expression and that the output of each AND-gate is connected to one input of OR-gate 110. $Y_4$ will thus have one output state when the input conditions for any one of the AND-gates are satisfied. In practice ROM (read only memory) which is implemented as a single chip would be used to implement logic described above.

Figure 5:
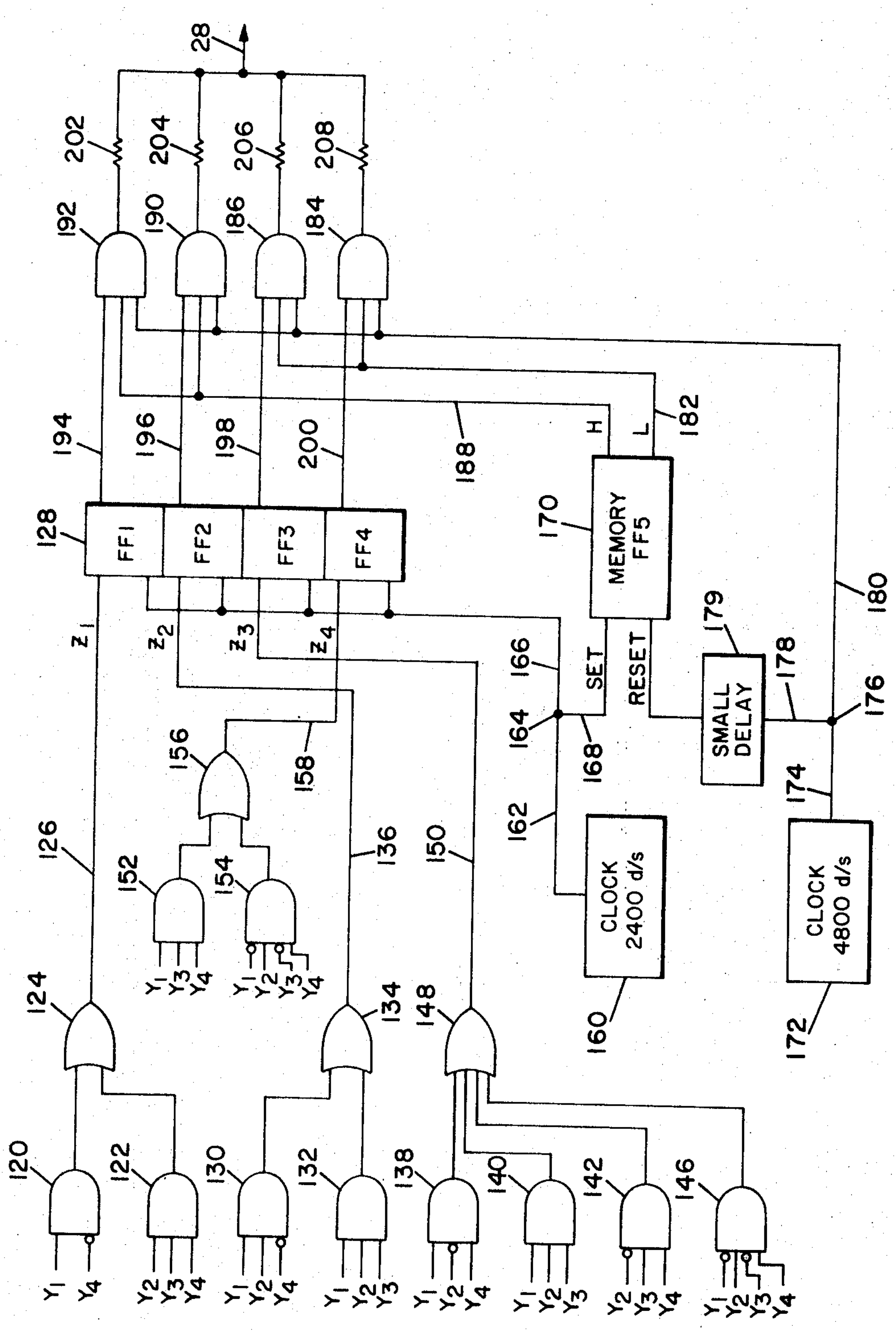
FIG. 5 is a block diagram of a sequential converter which may be used to convert the coded signal from the logic processor into groups of $m$, Q-level signals, for the case where Q = 3.

Following coding in logic processor 16 the encoded binary signals are converted into $m$, Q-level sequential signals in sequential converter 26. For our illustrative example where $Q = 3$, $m = 2$, $n = 3$, $p = 4$, for a bit rate of 7,200 bits per second over a 2,400 hertz channel, a sequential converter which performs the desired sequential conversion is shown in FIG. 5. Here the coded binary signals $Y_1$ through $Y_4$ are converted into two, ternary sequential nonbinary coded signals. The input and desired output signals obtained from the sequential conversion process are illustrated in Table II. Note that the least significant digit of the coded binary is represented by a "don't care" condition for all but the last two binary words which represent the sequential ternary signals 2 1 and 2 2. In order to properly identify the coded binary words for conversion purposes, each binary digit must be represented by only one state. Further, it would be desirable if one pair of binary digits would always be representative of the most significant digit of the ternary pair and the other pair of binary digits would be representative of the least significant digit of the ternary pair. The following truth table, Table IV, is an extension of Table II by the addition of the binary digits $Z_1$ through $Z_4$. In order to change from Y to the Z binary coded words, the following logic equations were derived using the well-known Karnaugh mapping technique described in his article "The Map Method for Synthesis of Combinational Logic Circuits," appearing at pages 593–599 of A.I.E.E. Transactions, Part I: Communications and Electronics; Vol. 72, November 1955.

$$Z_1 = Y_1 \overline{Y}_4 + Y_2 Y_3 Y_4 \qquad (11)$$

$$Z_2 = Y_1 Y_2 \overline{Y}_4 + Y_1 Y_2 Y_3 \qquad (12)$$

$$Z_3 = Y_1 \overline{Y}_2 Y_4 + Y_1 Y_2 Y_3 + \overline{Y}_2 Y_3 Y_4 + \overline{Y}_1 Y_2 \overline{Y}_3 Y_4 \qquad (13)$$

$$Z_4 = Y_1 Y_3 Y_4 + \overline{Y}_1 Y_2 \overline{Y}_3 Y_4 \qquad (14)$$

Of course, the logic result may be attained by other techniques.

In Table IV, the ternary digits $X_1$ and $X_2$ are related to the converted coded binary as follows:

$$X_1 = Z_1 + Z_2 \qquad (15)$$

$$X_2 = Z_3 + Z_4 \qquad (16)$$

where + is algebraic and not logic addition. The auxiliary variables $Z_i$ obtained from $Y_i$ are used to generate three levels 0, 1 and 2 in pairs as shown in Table IV. In effect $Z_i$ provides the lgoic conversion means of converting the binary form $Y_i$ into three-level form $X_i$.

TABLE IV

| Coded Binary | | | | Converted Coded Binary | | | | Ternary | |
|---|---|---|---|---|---|---|---|---|---|
| $Y_1$ | $Y_2$ | $Y_3$ | $Y_4$ | $Z_1$ | $Z_2$ | $Z_3$ | $Z_4$ | $X_1$ | $X_2$ |
| 0 | 0 | 0 | *d* | 0 | 0 | 0 | 0 | 0 | 0 |
| 0 | 0 | 1 | *d* | 0 | 0 | 1 | 0 | 0 | 1 |
| 0 | 1 | 0 | *d* | 0 | 0 | 1 | 1 | 0 | 2 |
| 0 | 1 | 1 | *d* | 1 | 0 | 0 | 0 | 1 | 0 |
| 1 | 0 | 0 | *d* | 1 | 0 | 1 | 0 | 1 | 1 |
| 1 | 0 | 1 | *d* | 1 | 0 | 1 | 1 | 1 | 2 |
| 1 | 1 | 0 | *d* | 1 | 1 | 0 | 0 | 2 | 0 |
| 1 | 1 | 1 | 0 | 1 | 1 | 1 | 0 | 2 | 1 |
| 1 | 1 | 1 | 1 | 1 | 1 | 1 | 1 | 2 | 2 |

Implementation of these logic relations is accomplished by AND-gates 120, 122, 130, 132, 138, 140, 142, 146, 152 and 154, and OR-gates 124, 134, 148 and 156. AND-gates 120 and 130 have inhibit inputs for the $Y_4$ input; AND-gates 138 and 142 have inhibit inputs for the $Y_2$ input; and, AND-gates 146 and 154 each have inhibit inputs for the $Y_1$ and $Y_3$ inputs. These inhibit circuits invert the binary input from 0 to 1 and from 1 to 0. For example, the $Y_1$ and $Y_4$ inputs to the AND-gates may be $Y_1 = 1$ and $Y_4 = 0$. The $Y_4$ input would be inverted so that AND-gate 120 would see the $Y_4$ input as a 1. For the $Y_1 = 1$ and $Y_4 = 0$ imput conditions, AND-gate 120 would provide a 1 output which would be applied to FFI of register 128 via OR-gate

124 and connection 126. Where $Y_1 = 0$ and $Y_4 = 1$ or both $Y_1 = 0$ and $Y_4 = 0$, the output of AND-gate 120 is 0. A similar analysis may be made for the input conditions for each AND-gate and for the final application of a binary signal to one of the stages of register 128. The binary output $Z_i$ are read-in in parallel, at the rate of 2,400 digits per second, to the four flip-flops FFI through FF4 of register 128. This is accomplished with the aid of clock 160 which is operating at the 2,400 digit per second rate. Clock 160 may be a separate clock as shown or the clocking signal may be derived from the 4,800 digits per second clock 172. The flip-flops FF1 through FF4 may be D-type flip-flops. These have the feature that after read-out it is not necessary to reset them to zero, since whenever read-in from $Z_i$ takes place, the previous values are automatically erased internally and the new values are read-in.

Read-out from register 128 is done in paris at the 4,800 digit per second rate. The output of each flip-flop is applied as one input to an AND-gate. The output of FF1, for example, is applied as one input to AND-gate 192 via connection 194 and FF2 is applied as one input to ADD-gate 190 via connection 196. A second input to AND-gates 190 and 192 comes from memory flip-flop FF5, 170, via connection 188 which is labled H. The other output of FF5 is applied to AND-gates 184 and 186 via connection 182 which is labled L. Clock timing to each of the four output AND-gates comes from 4,800 digit per second clock 172 via connection 174, junction 176, and connection 180.

The sequence of operation of the sequential converter shown in FIG. 5 may be described as follows. First, let us assume that one output from 4,800 digit per second clock 172 is delayed by small delay 179, a small amount relative to the 2,400 digit per second clock 160. At the beginning of a cycle period, FF5 is in a condition such thet H = 0 and L = 1, which is equivalent to the reset condition. Next, clock 160 reads new values of $Z_i$ into register 128. At the same time clock 160 sets FF5 to condition H = 1 and L = 0. Next, clock 172 reads out FF1 and FF2 with H = 1. The bottom two AND-gates are not read out at all and have no output since L = 0. Next, clock 172 resets FF5 to L = 1 and H = 0. Notice that this reset is accomplished through a small RC delay so as not to interfere with the 4,800 read-out with H = 1 of the previous step. The next clock pulse of 172 reads out FF3 and FF4 since FF5 is in condition such that L = 1 and H = 0. Now the top two AND-gates have no outputs but the bottom two AND-gates have outputs. Further, FF5 is in condition L = 1 and H = 0 and the cycle starts all over again.

Referring again to FIG. 5, let us look at the outputs of the four AND-gates. At the rate of 4,800 digits per second, the top two AND-gates are activated first and provide outputs into the two top resistors and the outputs of these resistors are algebraically added. Since the outputs could be either 0 or 1 from each AND-gate, the algebraic sum of the two top resistors will provide either 0, or 1, or 2. This is equivalent to providing one of the three possible levels. Similarly, for the second half of the 4,800 digits per second cycle, the two top AND-gates are open and inactive, and the two bottom gates are activated, and the two bottom resistors provide the algebraic sum of the outputs of the two bottom AND-gates. This algebraic sum is again either 0, 1, or 2. Consequently, at connection 28, which constitutes the output of the sequential converter, we have a sequential pair of three-level digits at 4,800 digits per second.

Referring again to FIG. 1, the 5-level waveform at 32 must be decoded in pairs at the receiver. If so, then the forbidden sequence 2 2, which may appear at 28, will never appear at 32 or at the receiver unless line transmission impairments alter the waveform. The forbidden pattern 2 2 corresponds to several sequences at 32, namely, 2 2, 2 -1, -1 2, -1 -1. All of these are, indeed, 2 2 provided they are given modulo 3 interpretation. Consequently, none of the four sequences may appear at 32.

Figure 6:
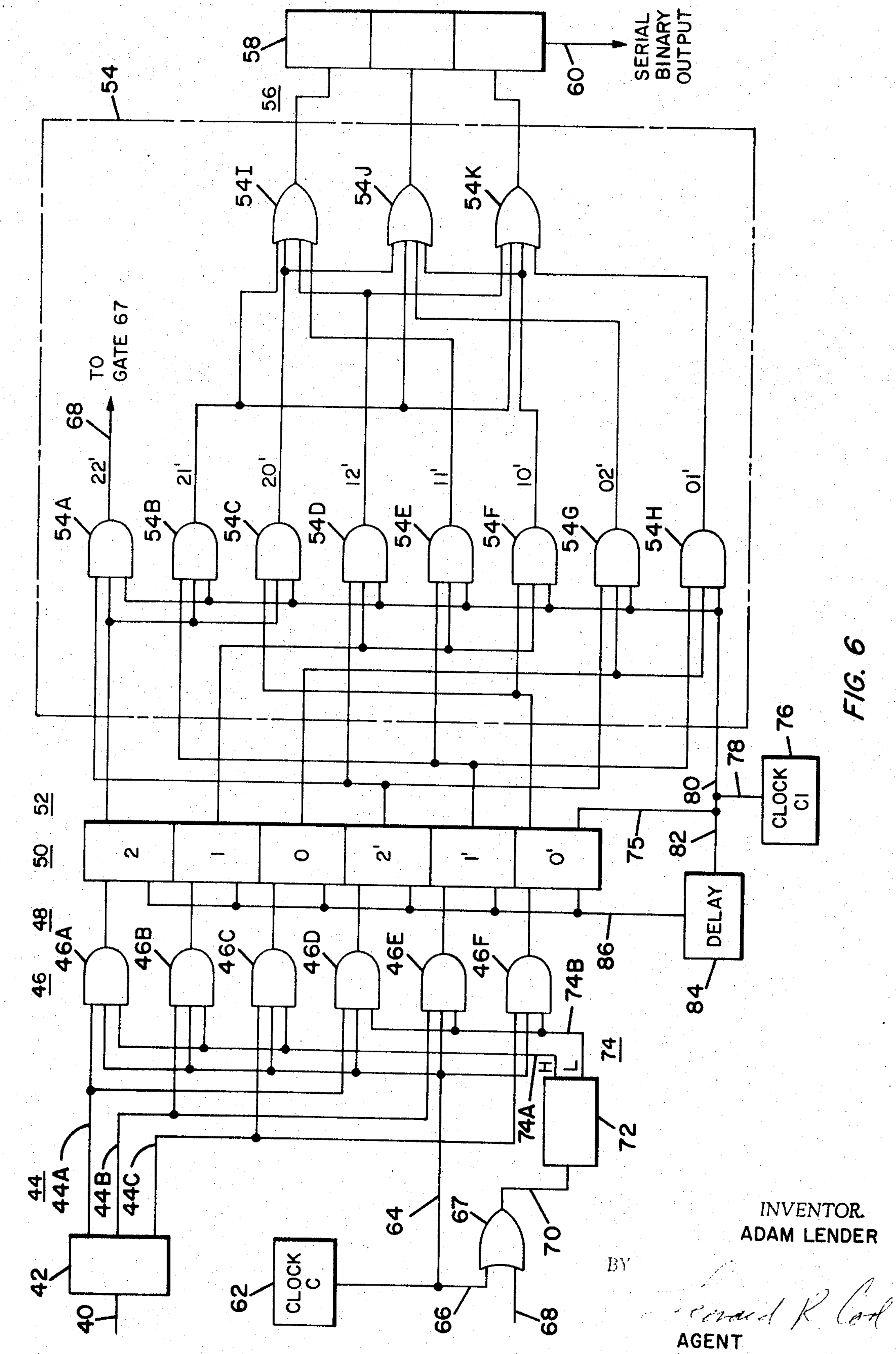
FIG. 6 is a detailed block diagram of a binary data reconstructor, including the framing correction circuit, for the case where Q = 3.
Figure 7:
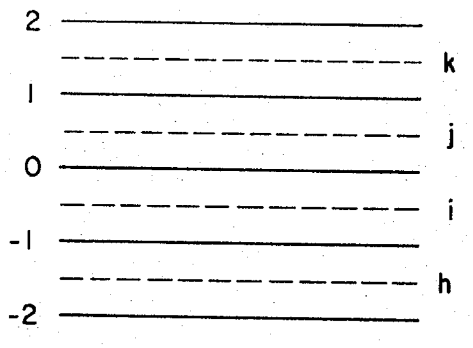
FIG. 7 depicts slicing levels of threshold detector in FIG. 2.

Referring now to FIG. 6, the correlative nonbinary signal having (2Q − 1) levels enters the receiver at lead 40. The method of transmitting the signal, i.e., via carrier either double or single sideband, and the use of delay equalization may require detection and processing before the non-binary baseband signal is derived. Such techniques may be used with the correlative nonbinary coding techniques disclosed herein in order to facilitate transmission of the signal from one point to another. Folowing detection and processing, if necessary, the (2Q − 1)-level signal is applied to threshold detector and logic unit 42. The amplitude of the (2Q − 1)-level signal may be determined by an arrangement of (2Q − 2) slicers. Next the amplitudes are interpreted by the logic in a modulo Q manner so that only Q values are obtained at the output. In the instant example there would be 2Q − 2 = 4 slicers (threshold detectors), which would provide an indication of five levels. These levels to be indicated are 2, 1, 0, −1 or −2 where 2 is the top level and −2 the bottom level. The slicing levels are indicated by the dotted lines in FIG. 7. These slicing levels are located halfway between the normal amplitude levels, and it is apparent that, for the intermediate levels, the incoming signal amplitudes between adjacent slicing levels will be given only one interpretation. For example, amplitudes between slicing levels *h* and *i* will be interpreted as −1. At the outer limits, the range of interpretation is either below the lowest slicing level (*h*), which is interpreted as −2, or above the highest slicing level (*k*), which is interpreted as 2. Being well known, it is believed unnecessary to describe a specific implementation of the threshold detection device. Suffice it to say that such devices may be on-off threshold level detectors which establish the slicing levels midway between adjacent amplitudes as shown by the dotted lines in FIG. 7. A circuit which performs the on-off threshold level function is a Schmitt trigger circuit. For a discussion of the operation of a Schmitt trigger circuit, reference may be made to the text, "Pulse Digital and Switching Waveforms", by Millman and Taub, McGraw-Hill, Inc., 1965, pps. 389–402. Further, slicing levels are shown in the text, "Data Transmission" by W. R. Bennett and J. R. Davey, McGraw-Hill, Inc., pps. 160, and slicing thresholds are discussed at pps. 96–99. The negative levels would be interpreted by logic in modulo 3 manner so that −1 = 2 and −2 =1. Consquently, an arrangement of four binary slicers and logic would indicate only three values, namely 0, 1 and 2.

Figure 8:
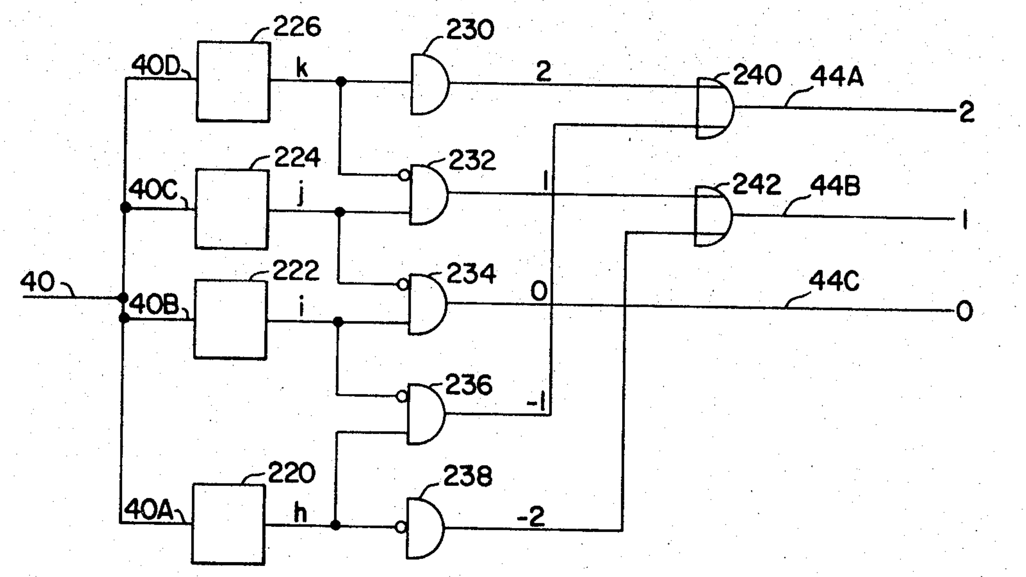
FIG. 8 is a detailed block diagram of threshold detector and logic of FIG. 2.

A threshold detector and logic circuit arrangement which performs the detection and modulo 3 interpretation is shown in FIG. 8 Operation of the circuit arrangement is straightforward. A (2Q − 1)-level signal, Q = 3 in our example case, is applied simultaneously, via lead 40 to the input of each threshold detector (slicer) circuit. The numbers identifying these units are 220, 222, 224 and 226. Each threshold detector will have an output only if the input is above a predetermined threshold level, and these levels correspond, for this example, to the slicing levels shown in FIG. 7. Correspondence between the slicing levels of FIG. 7 and the output of the threshold detectors 220, 222, 224, and 226 of FIG. 8 is maintained by including the letter designations, which represent the slicing levels, on the output lead of each threshold detector. The logic circuit follows the teachings of my U.S. Pat. No. 3,601,702 where reference should be made to FIG. 5 and the related discussion. In the instant example, there are fewer slicing levels than were shown in FIG. 4 of my patent so the logic is less complex. To illustrate the operation of the logic in FIG. 8, we assume that a signal amplitude of −1 is received. From FIG. 7 it can be seen that the signal amplitude is above the slicing level *h*, but is below the higher slicing levels *i*, *j*, and *k*. Only slicer 220 has an output. Thus, gate 230 would have an input but does ot have an output because of the inhibit circuit at the input to the gate. AND-gate 236 has an input from slicing level *h*, but it does not have an input from slicing level *i*. However, the *i* level input is applied to an inhibit input, and is inverted thereby. Thus, gate 236 actually has an effective 11 input and therefore provides an output. Tis output is applied via OR-gate 240 to output lead 44*a*. Thus the (2Q − 1)-level input has been changed modulo 3 to a Q-level signal, i.e. from −1 to 2.

The input data is interpreted in detectors and logic unit 42 in terms of three levels and transferred at the rate of 4,800 digits per second through m sets of ligic gates 46, to shift register 50. There are m shift registers each having Q states. Thus for our example, there are two (*m* = 2) shift registers with each having three (Q = 3) stages. The upper shit register contains the first, or most significant, digit of a ternary pair. The lower shift register contains the second, or least significant, digit of the pair. In essence, a pair of ternary digits is read into these two shift registers at the rate of 4,800 digits per second in a sequential manner. This first digit of the pair is first read into one of the three stages of the upper shift register. In the next time interval the second digit of a pair is read into one of the three stages of the lower shift register also at the 4,800 digits per second rate. Thus the read-in process is accomplished by a two-step sequence. To accomplish such a sequential read-in a memory circuit is employed. One such circuit is a counter such as is shown as 72 at the bottom left-hand corner of FIG. 2. For the case where a two-step sequence is required, counter 72 may be a standard flip-flop, and this is all that is necessary for our example case. This flip-flop is clocked at a rate of 4,800 digits per second in a complimentary manner so that it changes state after every input. The state of the flip-flop is used to enable the logic gate associated with the upper or lower shift register so that the amplitude level, i.e., 0, 1 or 2, is transferred sequentially into the registers and stored for parallel read-out. The read-out rate is equal to the read-in rate divided by *m*. Thus read-in is at the 4,800 digit per second rate which timing rate is supplied by Clock 62, to logic gates 46 by means of three paths. The first path is via lead 44 directly to one input of each of the logic gates 46. The second and third paths are obtained from clock C, lead 66, OR-gate 67, lead 70, counter (flip-flop) 72 and leads 74A and 74B. Note that one set of logic gates is connected to lead 74A and the other set of logic gates is connected to lead 74B. The state of counter 72 determines the set of logic gates into which the amplitude information is read in. Thus, the first path supplies clock timing to enable all of the logic gates whereas the second path enables only one set of gates at a time in order to derive the sequential output. The two 3-level sequential outputs are stored in the two 3-stage shift registers denoted by 50 and are read out in parallel. The read-out from the outputs of logic gates 46 passes via leads 48 to the appropriate stages of register 50. Read-out and reset timing for register 50 are supplied either by a separate clock C1, as sown at 76, or timing derived from clock C by dividing the C clock output by $m$. Read-out from the upper reg1ster is designated 0, 1 and 2 while that from the lower register is designated 0′, 1′ and 2′. Thus, pairs would be denoted 0 0′, 1 1′, 2 2′, et cetera, for each of the nine combinations. The $m$ parallel outputs from the $m$ shift register states are applied via connection 52 to logic network 54. In this example, a pair of 3-level digits are read out in parallel at a rate of 2,400 digits per second. Once read-out is completed, the registers 50 are reset to 0. This is accomplished by the delayed clock timing from clock C1 via connection 78, connection 82, dela 84 and connection 86. The delay is not critical but is necessary to permit read-out prior to reset.

It will be recalled that there are only eight valid patterns. These were given in Table I above. Of these, the one representing 0 0′ which would yield a binary pattern of 0 0 0 does not require a logic input to shift register 58 because the read-out of register 58 automatically clears it to state 0 0 0. Thus, seven logic gates may be used to receive the remaining valid patterns and one logic gate may be used to recognize the forbidden patterns. Operation of the logic network will be explained in terms of one ternary pair but it should be understood that operation will be similar for other logic patterns.

Referring again to FIG. 6 and assuming a 1 2′ output at connection 52, AND-gates 54D, 54E and 54F have an enabling input 1 and AND-gates 54A, 54D and 54G have an enabling input 2′. Only gate 54D has both enabling inputs and will provide an output at the C1 clock rate. For this case the 54D gate output is applied to both OR-gate 54I and OR-gate 54K which reads a 1 into each of the two outer stages of shift register 58 via connection 56. Recalling that the reset leaves each stage at 0, the condition of register 58 is now 1 0 1 with the inputs being read in at the 2,400 digit per second rate. Read-out from register 50 is serial at the 7,200 bit per second rate of the original data. Referring to Table I, it is evident that the ternary levels 1 2′ have been correctly changed back into the original date input states of 1 0 1.

Whenever a forbidden pattern occurs, such as 2 2′ or any of the forms which by modulo 3 interpretation yields 2 2′, and AND-gate 54A has an output and this output is applied via connection 68 to OR-gate 67 and lead 70 to counter 72. As a result the counter is shifted one step. For the present example, 72 is a flip-flop and an enabling pulse on lead 68 will caus1 the flip-flop to change state. This reverses the order of the two ternary digits applied to logic gates 46 which should then correct for the timing error, since forbidden patterns should not be present at this point.

A system using a fractional number of bits per digit may be further generalized. Take, for example, $Q = 5$. This will provide $(2Q - 1)$ or nine levels on the line. Using the 2,400 Hz channel as a reference bandwidth, 10,800 digits per second can be transmitted using the modified duobinary technique. Using equation 1, one arrives at $2^9 < 5^4$ for this system.

Here each group of four nine-level digits would represent nine binary digits. Nine levels and nine bits represented by a group of four digits are a mere coincidence The nunber of bits per digit is 2.5. However, the digit rate on the line would still be 4,800 per second, but the number of levels would be nine. The bit speed would, nevertheless, be 10,800 bits per second. The efficiency of the system is 512 divided by 625 a per equation 4 and the redundancy can be computed from equation 5. This redundancy would be utilized so that the forbidden patterns would be monitored to provide the correct framing of four digits. in this case there would be quite a few forbidden patterns which would help the framing, so that the successive four digits of the nine-level signal would be read in the correct sequence. The general system block diagram and logic would be similar to that in FIGS. 3 and 6. For example, logic processor 16 in FIG. 3 would have nine binary inputs from a nine-stage shift register and ten outputs $Y_1$ through $Y_{10}$ since 10 binary digits would be necessary to represent the 625 possible states. These 10 binary digits would be delayed by 1/1,200 seconds as in FIG. 3 and fed back to logic processor 16. As a result, logic processor 16 would have 19 parallel binary inputs and 10 parallel binary outputs both at the rate of 1,200 digits per second. Such a logic is quite feasible today since it can be implemented with read-only memories. In sequential conversion to five levels, a group of four sequential digits at the rate of 4,800 digits per second would appear at 28.

As to FIG. 6, depicting the decoding, the register marked 50 would have a total of 20 stages divided into four sections of five stages each and preceded by 20 AND-gates rather than six. The read-in process into register 50 would be at the rate of 4,800 digits per second. Negative-numbered levels would be interpreted in modulo 5 manner so that the output of logic unit 42 would have five parallel lines marked 0, 1, 2, 3 and 4. The most significant of the four 5-state digits would be read first into one of the stages of the first 5-stage register, followed by the next digit and so on until the least significant (fourth) digit is read into the fourth 5-stage register. To control the sequential read-in of four successive digits, the counter 72 would be a two-stage binary counter that counts from zero to three and then starts all over again. Te OR-gate 67 feeding the counter would remain with the input coming from the 4,800 bits per second clock and the second one from the framing error and violation detection circuit. The two-stage binary counter would supply the first pulse to the most significant bit five-stage register the next pulse to the next register until the fourth register is reached, and then all over again.

The read-out from register 50 would be parallel, that is, a single digit would be read out from each of the four shift registers. The read-out rate would be four times slower than the read-in rate and it would be at 1,200 digits per second. As soon as the read-out is completed, clock $C_1$ at the rate of 1,200 bits per second, rather than 2,400 bits per second as for Q = 3, would reset all shift registers 50 to zero through a small RC delay 84. The logic network 54 between registers 50 and register 58 in FIG. 6 would still be AND-OR. There would be 624 AND-gates rather than 625, since the gate to translate into an all-zero binary pattern for read-in into register 58 is unnecessary as indicted before. Each AND-gate would have four inputs, one from each of the four registers 50. Out of 624 AND-gates 113 of them would carry forbidden patterns since $5^4 - 2^9 = 113$ and these are therefore the 113 redundant states.

The remaining 511 AND-gates would carry valid patterns which would be gated into nine OR-gates, similar to those in FIG. 6. There would also be the 10th OR-gate fed by the 113 AND-gates carrying forbidden patterns. Each time a forbidden state would be indicated by the output of the 10th OR-gate, a framing error and violation pulse would be carried to the two-stage binary counter 72 thorugh the OR-gate 67. Such a violation pulse would step up the counter once. At most, three such extra pulses to the binary counter may be necessary to re-establish the correct framing. The logic comprising the 624 AND-gates and 10 OR-gates would be implemented by a read-only memory. Register 58 in FIG. 6 would be replaced by a nine-stage shift register. The read-in from the nine OR-gates would be at 1,200 digits per second in parallel, but the read-out would be at 10,800 bits per second in serial form.

Another example is the correlative nonbinary system with Q = 6 which has 11 levels on the line. The system still runs at 4,800 digits per second through the bandwidth of 2,400 Hz and it carries 12,000 bits per second. In accordance with the equation 1 the system inequality is $6^2 > 2^5$. Here there are 2.5 bits per digit. As per equations 4 and 5 the efficiency of the system is 32/36 and the redundancy 4/36. This redundancy can be used again to detect incorrect framing and to re-establish the proper framIng.

As far as the implementation is concerned, logic processor 16 in FIG. 3 would have five inputs originating from a five-stage shift register and six outputs $Y_1$ through $Y_6$, since 64 states are sufficient to represent the 36 states. These outputs would be delayed so that the overall input to logic processor 16 would consist of 11 binary parallel streams at the rate of 2,400 digits per second. There would be six binary outputs at the same rate. The sequential converter 26 would convert six binary inputs into two sequential digits each having one of the six possible amplitude levels. The conversion filter in all cases is the same as before. Likewise the line rate is always 4,800 digits per second, but in this case there are 11 levels on the line which carry 12,000 bits per second.

As far as the decoding process is concerned, as depicted in FIG. 6, in place of register 50 there is a shift register with 12 stages; six upper stages for the most significant bit and six bottom stages for the least significant bit. These pairs of bits would be transferred into what is shown now as the output register 58 which would have six stages rather than three. The violation detector for the appropriate framing would be similar but as before counter 72 is a single storage flip-flop FF with H and L outputs. The number of forbidden patterns would be four and they would be detected to re-establish the correct framing.

These three examples are representative of a wide range of similar systems which could be built using the teaching of my invention. In such systems efficiency is less than 100 percent and redundancy exists. However, this redundancy is used advantageously to detect framing violations so that the correct framing can be re-established. Sufficient generality is assured so that using these techniques any correlative nonbinary systems, where the number of bits per digit is fractional, can be designed without departing from the spirit and scope of my invention.

What is claimed is:

1. A digital transmission system for transmitting a correlative coded nonbinary signal at a transmission rate exceeding twice the frequency bandwidth of the channel comprising:

means for coding serial binary data having a bit rate of 1/T bits per second, according to the relation $C = B + \Delta^2 C$ modulo Q where, $C$ = coded nonbinary Q-level signal, $B$ = nonbinary Q-level signal prior to coding, $\Delta^2$ = a delay equal to two digit intervals, and $Q$ = an integer that is not a power of two and is greater than one into $m$ sequential Q-level signals including forbidden patterns, where $m$ is an integer which represents the number of Q-nary digits in a nonbinary group;

means for converting the $m$ sequential Q-level signals into a correlative coded signal having (2Q − 1) levels which excludes said forbidden patterns; and receiver means for reconstructing the original serial binary data from said correlative coded nonbinary signal.

2. A system in accordance with claim 1 in which said coding means further comprises:

serial-to-parallel conversion means for converting said serial binary data into $n$ parallel binary streams, where $n$ is an integer which represents the number of binary digits in a $Q^m$ group and is determined by minimizing the quantity $Q^m > 2^n$;

logic processor means having two inputs and an output, one said input being connected to the output of said serial-to-parallel converter, and said output providing $p$ coded parallel binary output signals, where $p$ is the exponent selected to minimize the relationship $Q^m < 2^p$;

delay means having a delay equal to two digit intervals, $2 \times nT/m$ seconds, where T is the bit duration of said serial binary data, the input of said delay means being operatively connected to the output of said logic processor and having its delayed output operatively connected to the other input of said logic processor; and sequential converter means having an input operatively connected to the output of said logic processor to accept said $p$ parallel coded binary signals and to convert these signals into m sequential Q-level signals.

3. A system in accordance with claim 2 in which said serial-to-parallel conversion means further comprises a shift register having $n$ parallel outputs.

4. A system in accordance with claim 2 in which said logic processor means further comprises:

a first input of $n$ noncoded parallel binary streams, from said serial-to-parallel conversion means, each stream having a rate of $1/nT$ bits per second;

a second input of $p$ parallel coded binary streams each having a rate of $1/nT$ bits per second, said $p$ coded streams being obtained from the coded output of said logic processor and being delayed two digit intervals;

logic means for combining the $n$ noncoded binary streams and said delayed $p$ coded binary streams according to the relation $C = B + \Delta^2 C$ modulo Q.

5. The system according to claim 4, wherein $Q = 3$, $n = 3$, $m = 2$ and $p = 4$, in which said logic processor means further comprises:

a first input of three noncoded parallel binary streams from said serial-to-parallel conversion means, each stream having a rate of $1/n$T bits per second;

a second input of four encoded parallel binary streams each having a rate of $1/n$T bits per second, said four encoded streams being obtained from the coded output of said logic processor and being delayed two digit intervals; and logic means which satisfies the following logic expressions $Y_1 = \bar a \bar b c d + a \overline{c d} e + \overline{a c} d f + \overline{a b} d e + \overline{a c} d e + a \bar b d \bar e + a c \overline{d f} + a b \overline{d e} + a b \overline{d f} + a \overline{b c d} f + \bar b c \bar d e f + \bar a b \bar d e f + \bar a b c \bar d f + \bar a b c \bar d e + \bar a b c d \bar e + b \bar c d e f + a b c e \bar f + a b c d e \bar g$;

$Y_2 = a \overline{b c} e + \overline{b c d} e + \bar a b \overline{e f} + \overline{a b} d e + \overline{a c} d e + \bar b c \bar e f + \bar a c d \bar e + \bar b c d \bar f + c d \overline{e f} + a \bar b d \bar e + a b \overline{d e} + a b \overline{d f} + \overline{b c} e f g + a \overline{b d} e f + a \bar c d \bar e f + a b \bar c e \bar f + \bar a b c \bar d e f + b c d e f g$;

$Y_3 = a \overline{b c} f + c \overline{d e f} + b c e \bar f + a \overline{d e} f + a \bar c d \bar f + a c \bar d f + \overline{a c d} e f + \bar a b \bar d e \bar f + \bar a b d \overline{e f} + a \overline{b c d} e + \bar a c d \bar e f + \bar b c d \bar e f + \bar a c d f \bar g + b \bar c d e g + a \bar b c f g + a \bar b c e f + \overline{a b c d e} \bar f$;

$Y_4 = \overline{c f} + \bar a c f + c \bar d f + \overline{a b c} g$;

where $Y_1$, $Y_2$, $Y_3$ and $Y_4$ each represents one of the four coded binary streams at the output of said logic processor; $a$, $b$ and $c$ represent the three noncoded parallel binary streams from said serial-to-parallel conversion means; and $d$, $e$, $f$ and $g$ represent the four delayed encoded parallel binary streams.

6. A system in accordance with claim 2 in which the sequential converter means further comprises:

logic conversion means for changing the $p$ coded binary output signals into $p$ converted coded binary signals; and sequential summing means for deriving $m$, Q-level sequential signals.

7. A system in accordance with claim 6, wherein $Q = 3$, $n = 3$, $m = 2$ and $p = 4$, in which said sequential converter further comprises:

logic conversion means for changing the four coded binary input signals into four converted coded binary signals according to the following logic expressions $Z_1 = Y_1 \bar Y_4 + Y_2 Y_3 Y_4$ $Z_2 = Y_1 Y_2 \bar Y_4 + Y_1 Y_2 Y_3$ $Z_3 = Y_1 \bar Y_2 Y_4 + Y_1 Y_2 Y_3 + \bar Y_2 Y_3 Y_4 + \bar Y_1 Y_2 \bar Y_3 Y_4$ $Z_4 = Y_1 Y_3 Y_4 + \bar Y_1 Y_2 \bar Y_3 Y_4$ and sequential summing means for deriving two three-level sequential signals.

8. The sequential converter in accordance with claim 7 wherein said sequential summing means further comprises:

a first clock operating at a digit rate of 1/2T having an output;

a second clock operating at a digit rate of 1/T having an output;

a delay circuit having its input connected to said second clock and having an output;

a memory circuit having two inputs and two outputs, one input being connected to said first clock and the other input being connected to the output of said delay circuit;

a four-stage shift register having one input of each stage connected to receive one of the four converted coded binary signals $Z_1$, $Z_2$, $Z_3$ or $Z_4$ which represent the outputs of said logic conversion means;

a first pair of AND-gates eah having one input that is connected to the output of said second clock and each having a second input that is connected to one output of said memory circuit, a third input of the first AND-gate of the pair operatively connected to the output of the first stage of said shift register and a third input of the second AND-gate of the pair operatively connected to the output of the second stage of said shift-register, each AND-gate having an output;

a first pair of summing resistors, the first resistor of the pair being connected at one end to the first AND-gate of said first pair, the seond resistor being conected at one end to the second AND-gate of said first pair and said resistors being connected together at the opposite ends thereof to form a junction;

a second pair of AND-gates each having one input that is connected to the output of said second clock and each having a second input that is connected to the other output of said memory circuit, a third input of the first AND-gate of said second pair operatively connected to the output of the third stage of said shift register and a third input of the second AND-gate of said pair operatively connected to the output of the fourth stage of said shift register, each AND-gate having an output; and a second pair of summing resistors, the first resistor of the pair being connected at one end thereof to the first AND-gate of said second pair, the second resistor being connected at one end thereof to the second AND-gate of said second pair and said resistors being connected together at the opposite end thereof and to said junction.

9. A system in accordance with claim 1 wherein said receiver means further comprises:

means for converting said $(2Q - 1)$-level correlative coded signal into $m$ parallel Q-level signals;

logic network means operatively connected to said converting means, said network means changing said $m$ parallel Q-level signals into $n$ parallel output signals representative of the original binary data when valid patterns are present and a separate output when forbidden patterns are present at the input; and register means having n inputs for accepting the $n$ parallel outputs from said network means for valid patterns, said register means providng a serial binary output.

10. A system in accordance with claim 9 wherein said converting means further comprises:

detector means having an input and an output for changing the correlative coded nonbinary signal applied to the input into a Q-level digital signal having a digit rate of 1/T at said output;

a first clock signal having a digit rate of 1/T;

a logic circuit means operatively connected to receive said first clock signal as one input and said separate forbidden pattern output signal on a second input, said logic circuit means providing an output signal for a like condition present on either or both of said inputs;

counting means having its input operatively connected to the output of said logic circuit means, said counting means providing $m$ sequential output states in order and changing state whenever an input signal is applied from said logic circuit means;

$m$ sets of logic gating means each set providing one of Q output states at its output, a first input to each set operatively connected to the output of said detector means, a second input to each set being operatively connected to receive said first clock signal, and a third input from said counting means wherein only one of said Q-states is applied to any one set of said logic gating means;

a second clock signal having a digit rate of $1/nT$;

storage means operatively connected to the output of said logic gating means for storing said $m$ sequential Q-level sinals at said first clock signal rate, and operatively connected to receive said second clock signal to read out said $m$ signals in parallel at a digit rate of $1/nT$.

* * * * *